United States Patent
Wu et al.

(10) Patent No.: US 12,142,271 B2
(45) Date of Patent: Nov. 12, 2024

(54) CROSS-DEVICE VOICEPRINT RECOGNITION

(71) Applicant: Samsung Electronics Co., Ltd., Suwon-si (KR)

(72) Inventors: Yongchao Wu, Nanjing (CN); Jie Chen, Nanjing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 358 days.

(21) Appl. No.: 17/417,720

(22) PCT Filed: Dec. 30, 2019

(86) PCT No.: PCT/KR2019/018735
§ 371 (c)(1),
(2) Date: Jun. 23, 2021

(87) PCT Pub. No.: WO2020/139058
PCT Pub. Date: Jul. 2, 2020

(65) Prior Publication Data
US 2022/0076674 A1  Mar. 10, 2022

(30) Foreign Application Priority Data
Dec. 28, 2018 (CN) .......................... 201811620418.7

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01)

(58) Field of Classification Search
USPC ...................................................... 704/1–504
See application file for complete search history.

(56) References Cited

U.S. PATENT DOCUMENTS

| 4,780,906 A | 10/1988 | Rajasekaran et al. |
| 6,438,520 B1 | 8/2002 | Curt et al. |

(Continued)

FOREIGN PATENT DOCUMENTS

| CA | 2077728 A1 | 6/1993 |
| CN | 101047508 A | 10/2007 |

(Continued)

OTHER PUBLICATIONS

China National Intellectual Property Administration (CNIPA) Of P.R. China, "The Second Office Action" issued Dec. 30, 2021, in connection with Chinese Patent Application No. 201811620418.7, 14 pages.

(Continued)

*Primary Examiner* — Marcus T Riley

(57) ABSTRACT

According to an embodiment, an electronic device is provided. The electronic device includes: at least one processor; and a memory comprising instructions, which when executed, control the at least one processor to: receive a voice instruction of a user at the electronic device; transmit information regarding the voice instruction to a control device for identifying the user by mapping to a first voiceprint which is registered by another electronic device, a second voiceprint of the voice instruction of the user based on a voiceprint mapping model; and perform an operation corresponding to the voice instruction upon the identification of the user.

14 Claims, 8 Drawing Sheets

(56) References Cited

U.S. PATENT DOCUMENTS

| | | | |
|---|---|---|---|
| 9,143,610 B2 * | 9/2015 | Hodge | H04M 17/305 |
| 9,190,062 B2 * | 11/2015 | Haughay | G10L 17/00 |
| 9,262,612 B2 * | 2/2016 | Cheyer | G06F 21/32 |
| 9,558,749 B1 | 1/2017 | Secker-Walker et al. | |
| 9,595,260 B2 | 3/2017 | Shen et al. | |
| 9,607,137 B2 | 3/2017 | Nicholson et al. | |
| 9,626,971 B2 | 4/2017 | Rodriguez et al. | |
| 9,633,652 B2 | 4/2017 | Kurniawati et al. | |
| 9,633,660 B2 * | 4/2017 | Haughay | G10L 17/00 |
| 9,721,561 B2 | 8/2017 | Tang et al. | |
| 9,824,692 B1 | 11/2017 | Khoury et al. | |
| 9,852,424 B2 | 12/2017 | Broman et al. | |
| 9,917,833 B2 | 3/2018 | Gomar | |
| 9,930,533 B2 | 3/2018 | Jin et al. | |
| 10,049,675 B2 * | 8/2018 | Haughay | G10L 15/22 |
| 10,657,969 B2 | 5/2020 | Shi et al. | |
| 10,692,504 B2 * | 6/2020 | Haughay | G10L 17/08 |
| 11,050,683 B2 * | 6/2021 | Ban | H04L 69/08 |
| 11,094,313 B2 * | 8/2021 | Marcinkiewicz | G10L 15/02 |
| 11,538,472 B2 * | 12/2022 | Singh | G10L 17/02 |
| 11,646,012 B2 * | 5/2023 | Kwon | H04W 12/50 704/246 |
| 11,700,231 B2 * | 7/2023 | Lederer | H04L 61/5061 709/245 |
| 2014/0188471 A1 * | 7/2014 | Haughay | G10L 17/00 704/246 |
| 2016/0071521 A1 * | 3/2016 | Haughay | G10L 17/00 704/246 |
| 2016/0104486 A1 * | 4/2016 | Penilla | G10L 25/45 704/232 |
| 2017/0094511 A1 * | 3/2017 | Na | H04W 76/11 |
| 2017/0133009 A1 * | 5/2017 | Cho | G10L 15/183 |
| 2017/0242657 A1 | 8/2017 | Jarvis et al. | |
| 2017/0316782 A1 * | 11/2017 | Haughay | G10L 17/08 |
| 2018/0197547 A1 * | 7/2018 | Shi | G10L 25/30 |
| 2018/0247065 A1 * | 8/2018 | Rhee | G06F 21/32 |
| 2018/0286395 A1 * | 10/2018 | Li | G10L 17/04 |
| 2018/0293990 A1 | 10/2018 | Li et al. | |
| 2018/0365695 A1 * | 12/2018 | Liu | G10L 15/22 |
| 2019/0035405 A1 * | 1/2019 | Haughay | G10L 15/22 |
| 2020/0152197 A1 * | 5/2020 | Penilla | H04L 67/125 |
| 2020/0302913 A1 * | 9/2020 | Marcinkiewicz | G10L 15/02 |
| 2021/0375265 A1 * | 12/2021 | Marcinkiewicz | G10L 15/02 |
| 2022/0076674 A1 * | 3/2022 | Wu | G10L 17/22 |

FOREIGN PATENT DOCUMENTS

| | | |
|---|---|---|
| CN | 104639517 A | 5/2015 |
| CN | 105321520 A | 2/2016 |
| CN | 108259280 A | 7/2018 |
| CN | 108288470 A | 7/2018 |
| CN | 108492830 A | 9/2018 |
| CN | 108615537 A | 10/2018 |
| WO | 2018213415 A1 | 11/2018 |

OTHER PUBLICATIONS

China National Intellectual Property Administration, "The First Office Action", issued Aug. 11, 2021, in connection with Chinese Patent Application No. 201811620418.7, 8 pages.

International Search Report and Written Opinion of the International Searching Authority in connection with International Application No. PCT/KR2019/018735 issued Apr. 23, 2020, 11 pages.

CSDN Blog, "Speech signal processing (4) Mel Frequency Cepstrum coefficient (MFCC)", http://blog.csdn.net/zouxy09, Jun. 23, 2013, 5 pages.

Huang, et al., "An Open Source Prosodic Feature Extraction Tool", School of Electrical and Computer Engineering Purdue University, West Lafayette, IN, May 2006, 6 pages.

* cited by examiner

|  | PCM 1 | PCM 2 | PCM 3 |
|---|---|---|---|
| DEVICE 1 | VFD 11 | VFD 12 | VFD 13 |
| DEVICE 2 | VFD 21 | VFD 22 | VFD 23 |
| ⋮ | ⋮ | ⋮ | ⋮ |
| NEW DEVICE | VFD | VFD | VFD |

CROSS-DEVICE VOICEPRINT RECOGNITION

CROSS-REFERENCE TO RELATED APPLICATIONS

This application is a 371 of International Application No. PCT/KR2019/018735, filed Dec. 30, 2019, which claims priority to Chinese Patent Application No. 201811620418.7 filed Dec. 28, 2018, the disclosures of which are herein incorporated by reference in their entirety.

BACKGROUND

1. Field

The present disclosure relates to voiceprint recognition, in particular, to cross-device voiceprint recognition.

2. Description of Related Art

A voiceprint is a spectrogram a voice, and shows an individually distinctive pattern of certain voice characteristics, thus, the voiceprint can be used for identification. Modern scientific research shows that the voiceprint does not only having specificity, but also has relative stability. In adulthood, a human voice may remain relatively stable for a long time without a significant change. Experiments have shown that no matter whether a speaker deliberately imitates a voice and a tone of another person, or whispers softly, voiceprints of the two people are different.

Voiceprint recognition is a technology for identifying a speaker based on voice parameters in a voice waveform reflecting physiological and behavioral characteristics of the speaker, which includes an operation of converting an acoustic signal of a voice of a user into an electrical signal which is then identified by a computing device.

A user may register his or her voice to a system for identification, and the system extracts a voiceprint from the voice as a user ID. When the user says a voice instruction, the voiceprint is extracted from the voice instruction, and associated with a corresponding ID, so as to distinguish the user from other users.

SUMMARY

Aspects of the disclosure are to address at least the above-mentioned problems and/or disadvantages and to provide at least the advantages described below. Accordingly, an aspect of the disclosure is to provide an apparatus and method for displaying a user interface.

Additional aspects will be set forth in part in the description which follows and, in part, will be apparent from the description, or may be learned by practice of the presented embodiments.

According to an embodiment, an electronic device is provided. The electronic device includes: at least one processor; and a memory comprising instructions, which when executed, control the at least one processor to: receive a voice instruction of a user at the electronic device; transmit information regarding the voice instruction to a control device for identifying the user by mapping to a first voiceprint which is registered by another electronic device, a second voiceprint of the voice instruction of the user based on a voiceprint mapping model; and perform an operation corresponding to the voice instruction upon the identification of the user.

According to an embodiment, a method is provided. The method includes: receiving a voice instruction of a user at an electronic device; transmitting information regarding the voice instruction to a control device for identifying the user by mapping to a first voiceprint which is registered by another electronic device, a second voiceprint of the voice instruction of the user based on a voiceprint mapping model; and performing an operation corresponding to the voice instruction upon the identification of the user.

According to an embodiment, a computer program product including a computer readable medium having stored thereon instructions, which when executed, cause at least one processor to carry out one of the above methods is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
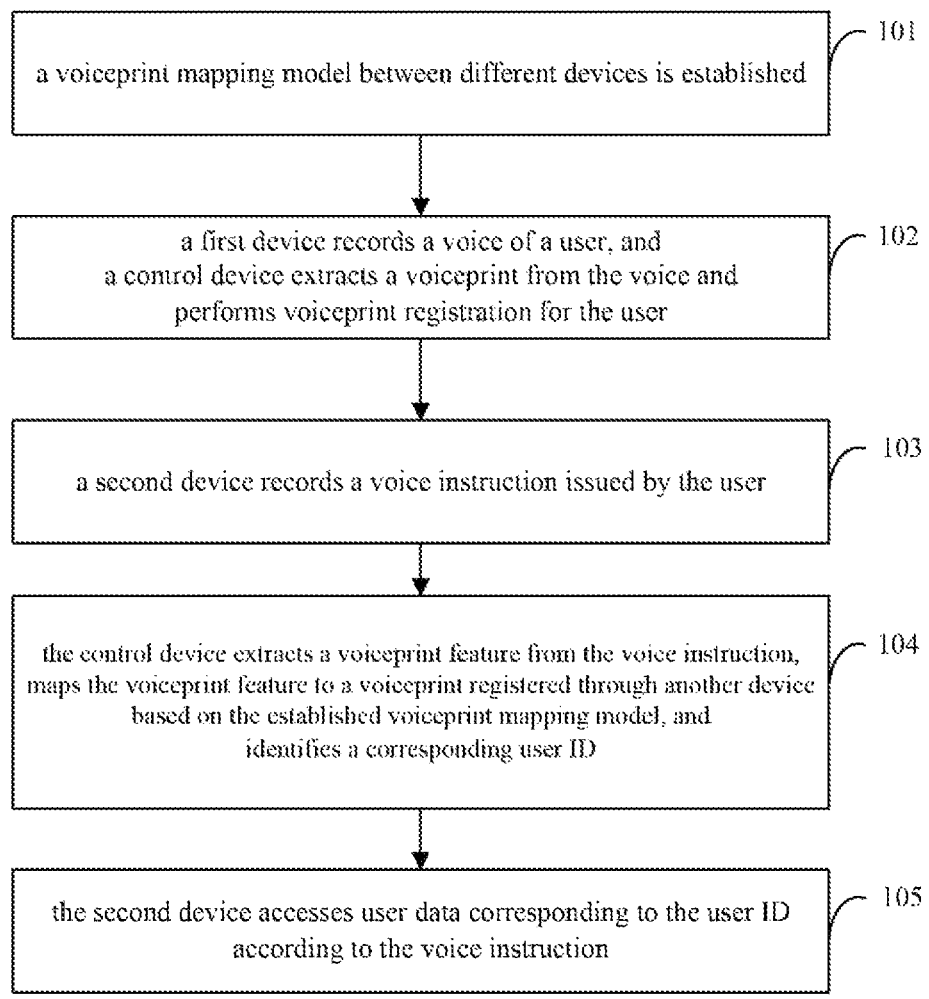
FIG. 1 is a schematic flowchart of a cross-device voiceprint recognition method according to an embodiment.

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application", "program", and "application program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "module", "engine", or "device" may refer to a unit which processes at least one function or operation and may be implemented by hardware, software, or a combination of hardware and software.

Figures discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Because there are differences in hardware of microphone devices, sound collection qualities of different devices are uneven, which may result in a lower accuracy of voiceprint recognition. For example, when a voice control is performed, using mobile phone 2, on a voiceprint of a user registered using mobile phone 1, it may not recognize the same person.

According to an embodiment, by establishing a voiceprint mapping model between different devices in advance, when a user issues a voice instruction using any kind of device, a registered voiceprint of the user may be mapped, thus a recognition rate of the user's voiceprint may be improved. The device may include a processor and a memory. Software modules such as program modules may be stored in the memory as a collection of instructions, and the instructions, when executed, may control the processor to perform corresponding operations.

Referring to FIG. 1, a cross-device voiceprint recognition method may include following steps, but is not limited thereto.

At step 101, a voiceprint mapping model between different devices (such as a TV voice remote control, a mobile phone, a recording pen, etc.) is established.

A specific process for establishing the voiceprint mapping model is described as follows.

First, voice data of a same person on different devices may be collected, a voiceprint is extracted, and a data record is established.

Then, voice data of multiple people may be collected using the above method, and voiceprints are extracted to establish a big data set. Explanation of collecting voice data will be described later by referring to FIG. 4.

Finally, according to the established big data set, a mapping model is trained in a deep learning manner to map a voiceprint of a same person on a device A to a device B. In turn, when users make a voice using different devices, it may also be determined whether they are the same person according to the mapping model. Explanation of extracting voiceprint features and generating mapping model will be described later by referring to FIGS. 5 and 6. Explanation of adding a new device to a generated voiceprint mapping model will be described by referring to FIG. 7.

It is assumed that f (device_y, voiceprint_x) is a mapping function of the voiceprint mapping model according to an embodiment. A voiceprint data from device_x (voiceprint_x) is input to the mapping function, and is mapped to device_y, the function then returns a voiceprint of device_y (voiceprint_y) in response to the voiceprint data from device_x (voiceprint_x). Herein, the training for the voiceprint mapping model may be an offline training, thus, privacy of users may be protected because raw voice data is not transmitted to a company or service provider. Herein, the voice recognition may be an online recognition, thus, load of devices of the user may be reduced significantly, while improving the accuracy of the voice recognition by a powerful cloud server.

At step 102, a first device records a voice of a user (for example, the user may read a preset prompt text displayed on the first device), a control device extracts a voiceprint from the voice and performs voiceprint registration for the user. The first device transmit information about the voice of the user to the control device. The information about the voice of the user may be voice data of the voice of the user. Herein, the control device refers to a device for performing control and processing in a network which is connected to the different devices including a first device and a second device. The control device may be a home controller in home, but is not limited thereto. The control device may be a cloud server.

The voiceprint registration may be performed by binding the voiceprint with an existing user ID, or to directly determine the voiceprint as the user ID. The plurality of electronic devices may be logged in with the user ID or have a login account for the user.

At step 103, a second device records a voice instruction issued by the user. The second device may transmit information about the voice instruction to the control device. The information about the voice instruction may be voice data of the voice instruction.

At step 104, the control device extracts a voiceprint feature from the voice instruction, maps the voiceprint feature to a voiceprint registered through another device based on the established voiceprint mapping model, identifies the user, that is, a corresponding user ID of the user, and retrieves corresponding user data of the user.

Explanation of mapping and identification will be described later by referring to FIG. 8. At step 105, the second device accesses the user data corresponding to the user ID according to the voice instruction. Corresponding to the above method, a cross-device voiceprint recognition system may be provided, and an example structure of the system is shown in FIG. 2, but is not limited thereto.

Figure 2:
FIG. 2 is a schematic structural diagram of a cross-device voiceprint recognition system according to an embodiment.

Referring to FIG. 2, a cross-device voiceprint recognition system may include a user system module, a voiceprint mapping management module, a voiceprint feature extraction module, a model generation management module, and a microphone. Herein, the user system module, voiceprint mapping management module, voiceprint feature extraction module, and model generation management module may be included in the control device. The microphone may be included in different devices in a home network. The different devices in the home network may have a same access point, but is not limited thereto. The different devices may be logged in with the same user or have an account of the same user.

According to an embodiment, the voiceprint mapping management module is to map a currently input voiceprint to a voiceprint of another device according to a pre-established voiceprint mapping model between different devices.

According to an embodiment, the voiceprint mapping model may be a pre-generated voiceprint mapping model between the different devices in the home network. The voiceprint mapping model may be generated through modeling by extracting a voiceprint feature, or may be generated through deep learning training, or may be generated through other manners.

According to an embodiment, the voiceprint feature extraction module is to extract a voiceprint feature based on input voice data. The voiceprint feature may be all of voiceprint data extracted based on the input voice, or may be part of the voiceprint data extracted based on the input voice.

According to an embodiment, the user system module may include a voiceprint registration submodule, a voiceprint matching submodule, a user ID submodule, and a user data submodule.

According to an embodiment, the voiceprint registration submodule is to associate a voiceprint of a newly registered user with an existing user ID in the user system.

According to an embodiment, the voiceprint matching submodule is to match a received voiceprint with a registered voiceprint to determine a corresponding user ID.

According to an embodiment, the user ID submodule is to maintain a user ID, where the user ID is a unique identifier of a user.

According to an embodiment, the user data submodule is to maintain user data, where the user data is private data related to a user, such as access history, favorites, etc.

According to an embodiment, the model generation management module is to establish a voiceprint mapping model between different devices. According to an embodiment, a music playback control may be performed across the different devices, which will be explained by referring to FIG. 3.

Figure 3:
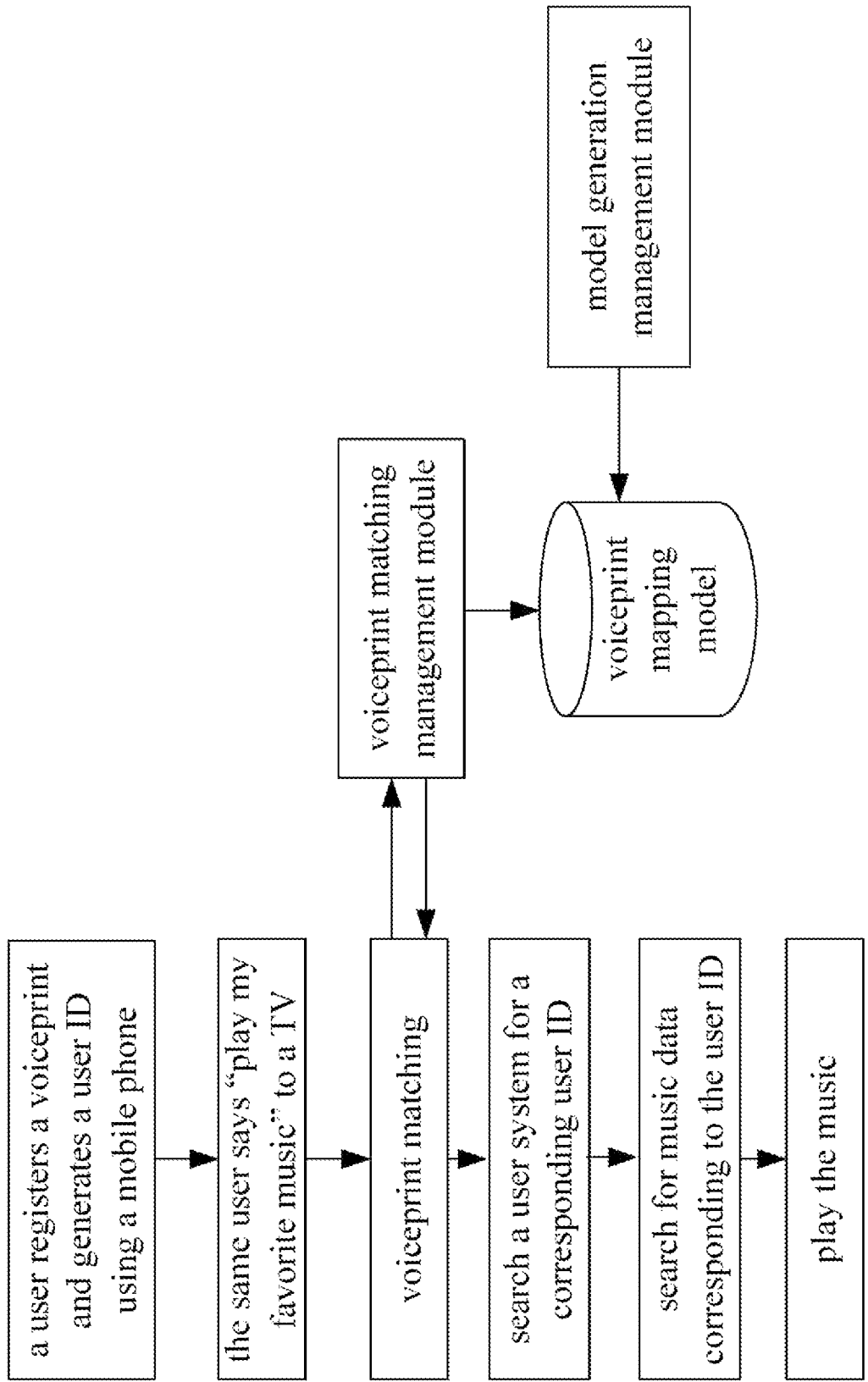
FIG. 3 is a schematic flowchart of performing music playback control across microphone devices according to an embodiment.

FIG. 3 is a schematic flowchart of performing music playback control across microphone devices according to an embodiment.

As a preprocessing part of the process, the control device may extract a voiceprint from voices recorded by each voice device, and establish a voiceprint mapping model of a mapping relationship between voiceprints of voices recorded by different devices by using extracted voiceprint feature, or by methods such as deep learning. In this case, the model generation management module as shown in FIG. 2 may perform the preprocessing part of the process.

The implementation process of performing music playback control across microphone devices shown in FIG. 3 is described as follows.

For example, a user may read a prompt text into a microphone of a mobile phone. The voiceprint registration module then extracts a voiceprint of the user and associates the voiceprint with a user ID, or directly determines the voiceprint as the user ID.

When the user using a TV, the user may say "play my music" to a TV remote control. At this time, microphone hardware is different in the TV remote control and the mobile phone, that is, recording environment is changed. Due to different device hardware parameters, voiceprint data may be different even though the same user says The voiceprint feature extraction module may extract a corresponding voiceprint based on a voice recorded by the current TV remote control. Because a registered voiceprint in the user system is the voiceprint collected by the microphone of the mobile phone, following voiceprint matching may be performed.

The voiceprint matching module of the user system may read the voiceprint mapping model through the voiceprint mapping management module, generate or emulate a voiceprint of the same sound recorded on another device where the voiceprint registration is performed, and match the generated or emulated voiceprint with the registered voiceprint in the system.

A corresponding user ID is searched for in the user system upon identification of the user. When the user ID does not exist, the match may be failed and a corresponding prompt is given. When the match is successful, the TV remote control or a TV connected to the TV remote control may access user data of the identified user. According to an embodiment, privacy of users may enhance while improving accessibility with voice instructions on multiple devices.

After the above processing is performed, when the corresponding user ID is found, subsequently voice instruction is analyzed and device control corresponding to the voice instruction may be performed.

According to an embodiment, a natural voice processing module may parse the voice instruction of the user and translate it into a device-executable command, and another execution unit may perform a corresponding operation according to the command.

According to an embodiment, the execution unit may access favorite music data of the user and play his or her favorite music.

According to an embodiment, a user's favorite TV show may be recommended as an example, which is described as follows.

The preprocessing part is substantially the same as above, and will not be repeated.

The implementation process of recommending a user's favorite TV show is described as follows.

For example, a user 1 may play martial arts TV series by his or her voice, for example, saying "Play Jin Yong's Condor Heroes"

According to an embodiment, the voiceprint extraction module may extract a voiceprint of the user 1 and associates the voiceprint with history playback data. When the voiceprint does not exist in the user system, a new user ID may be created. When the voiceprint exists in the user system, the history playback data may be imported into the corresponding user ID in the user system.

A user 2 may play a palace drama by his or her voice, for example, saying "I want to watch Zhen Xuan Zhuan"

According to an embodiment, the voiceprint extraction module may extract a voiceprint of the user 2, associates the voiceprint with history playback data of the user 2, and performs the same operation as the above step for the user 2.

It may be assumed that a television in the embodiment is installed with a TV drama recommendation system based on playing history of a user. The recommendation system may infer preferences of a user based on what the user has seen, and give a recommended TV drama.

The user 1 may say "play my favorite TV drama" at an initial state.

According to an embodiment, the voiceprint feature extraction module may generate a corresponding voiceprint based on the current voice.

According to an embodiment, the voiceprint matching module of the user system may read the voiceprint mapping model through the voiceprint mapping management module, generate or emulate a voiceprint of the same sound on another device, and match the generated or emulated voiceprint with the registered voiceprint in the system to identify the user 1, that is, to find a user ID corresponding the user 1.

According to an embodiment, the recommendation system may read the history playback data of the user 1 "Condor Heroes" and give a recommended TV drama such as "Shooting Heroes", "Xia Ke Xing", and etc. in line with preferences the user 1.

According to an embodiment, even when multiple users share one device together, their preferences may be analyzed appropriately, thereby, providing a personalized service to each user.

Herein, modules or submodules are merely named in order to distinctively describe operations performed according to an embodiment, thus, it should be understood that a certain operation described as being performed by a certain module may be performed by another module, a certain operation described as being performed in one module may be performed by a plurality of modules, a certain operation described as being performed by interactive processing of a plurality of modules may be performed by one module to provide same functionality.

Figure 4:
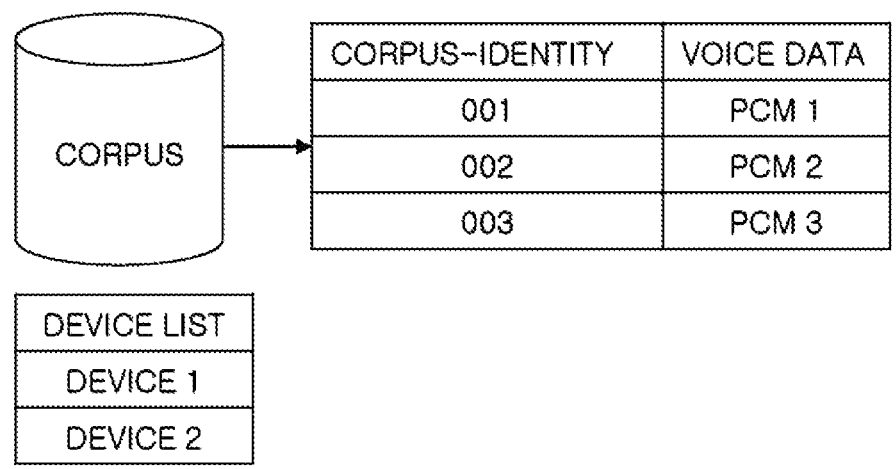
FIG. 4 is a diagram for explaining corpus data according to an embodiment.

FIG. 4 is a diagram for explaining corpus data according to an embodiment.

Referring to FIG. 4, a corpus database may be used to identify corpus from voice data collected from different devices. The voice data may be raw voice data, and may have a pcm format, but is not limited thereto.

Figure 5:
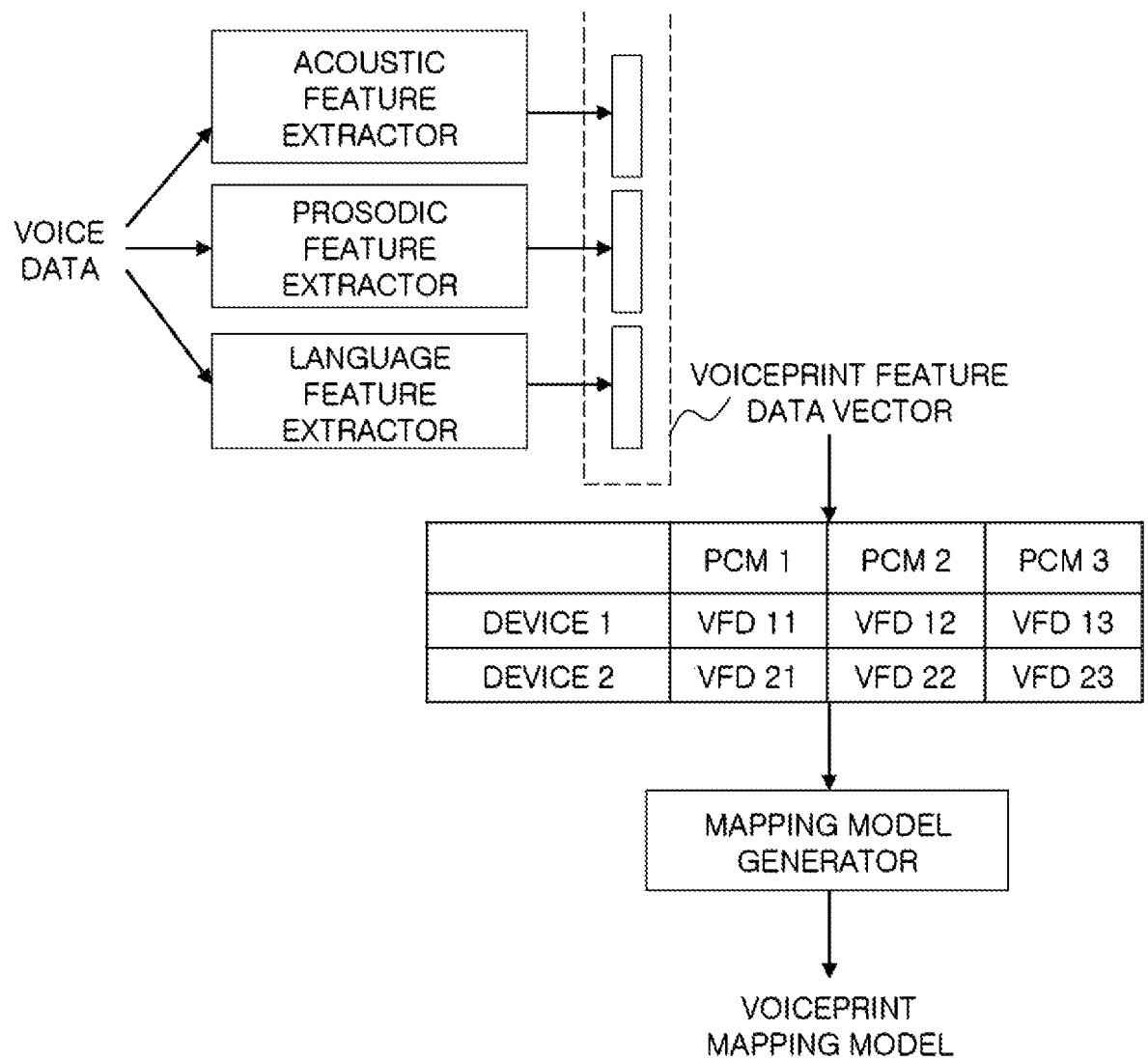
FIG. 5 is a diagram for explaining extraction of voice feature according to an embodiment.

FIG. 5 is a diagram for explaining extraction of voice feature according to an embodiment.

Collected voice data may be processed by a voiceprint feature extractor (VFE) including an acoustic feature extractor, a prosodic feature extractor, and a language feature extractor. The VFE may process the raw pcm voice data in multiple aspects, for example, by extracting acoustic features, prosodic features, and language features.

The acoustic feature is to investigates time domain features such as the mean squared amplitude of a waveform of voice data, its duration, its fundamental frequency, or frequency domain features such as the frequency spectrum, or even combined spectrotemporal features and the relationship of these properties to other branches of phonetics (e.g. articulatory or auditory phonetics), and to abstract linguistic concepts such as phonemes, phrases, or utterances. MFCC (Mel Frequency Cepstral Coefficents) may be used for acoustic feature representation.

The prosodic features is used to extracting features by a variety of spoken language processing tasks such as sentence segmentation and tagging, disfluency detection, dialog act segmentation and tagging, and speaker recognition. It include: duration feature, energy feature, F0 feature and etc., but is not limited thereto.

The language feature is may be analyzed by automatic speech recognition (ASR) and natural language processing (NLP) to extract words and create the tokens that user use more frequently.

The data from these three aspects may be represented as a vector which is referred to as a voiceprint feature data vector. For exach pcm file in the corpus, its voiceprint feature data (VFD) may be calculated on different devices as a table illustrated in FIG. 5.

Referring to FIG. 5, a mapping model generator may generate and train a voiceprint mapping model with voiceprint feature data vectors extracted from voice data which is collected from different devices. Training may be supervised, semi-supervised or unsupervised as opposed to task-specific algorithms.

Figures 6, 7:
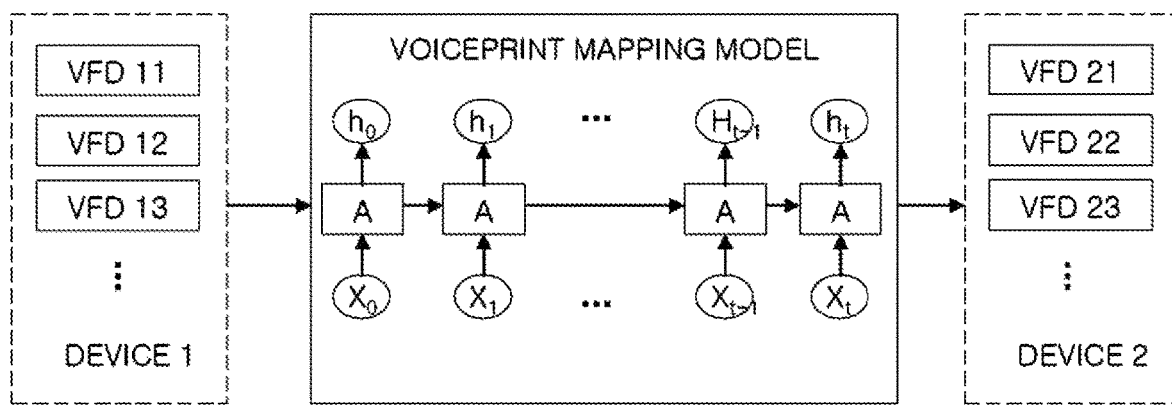
FIG. 6 is a diagram for explaining generation of a voiceprint mapping model according to an embodiment.
FIG. 7 is a diagram for explaining addition of a new device according to an embodiment.

Based on the VFD calculated as the table illustrated in FIG. 5, the voiceprint mapping model may be trained as illustrated as FIG. 6.

FIG. 6 is a diagram for explaining generation of a voiceprint mapping model according to an embodiment.

VFD on device 1 is input into the voiceprint mapping model, VFD on device 2 is output from the voiceprint mapping model, which indicates that the voiceprint mapping model is capable of mapping VFD on a device to VFD on another device.

The voiceprint mapping model may be generated and trained, by collecting all VFD for device 1 and device 2, and importing VFD of device 1 into the voiceprint mapping model, adjusting weights in each note in a neural network illustrated in FIG. 6, outputting VFD on device 2, and repeating these operations. Generation and training of the voiceprint mapping model may be conducted offline, and the voiceprint mapping model may be deployed to a server side.

FIG. 6 illustrates a recurrent neural network as an example, but other types of neural network may be used according to an embodiment.

FIG. 7 is a diagram for explaining addition of a new device according to an embodiment.

When a new device is added to a home network, the voiceprint mapping model may be trained with data from the new device as illustrated in FIG. 7. Update of the voiceprint mapping model may be conducted offline, and the updated (trained) voiceprint mapping model may be deployed to a server side. Voice registration is explained above by referring to FIGS. 1-3, explanation of the voice registration is not repeated.

Figure 8:
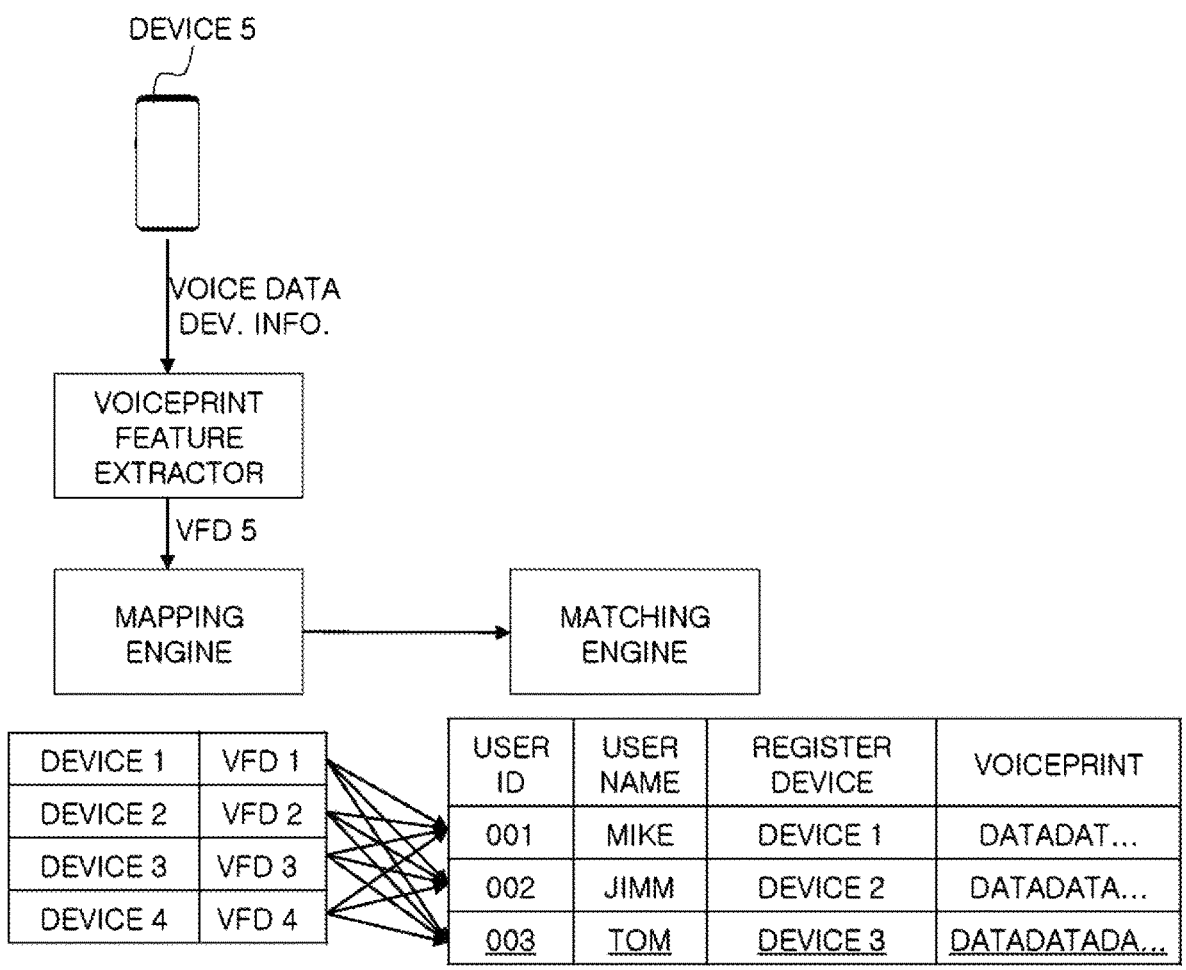
FIG. 8 is a diagram for explaining mapping and matching of a voiceprint according to an embodiment.

FIG. 8 is a diagram for explaining mapping and matching of a voiceprint according to an embodiment.

For example, when a user registers his voice with device 3, then he starts to use device 5 do voice interaction. In order to identify the same speaker, following mapping and matching process may be performed.

According to an embodiment, with voiceprint data of device 5, a VFD table is updated to contain VFD on all devices. Mapping the voiceprint data of device 5 to other device to generate or simulate voiceprint data of the other device, and matching the generated or simulated voiceprint data of the other device to a registered voiceprint may be iterated to identify the user. Referring to FIG. 8, Tom may be identified as a current speaker.

VFD comparing (matching) criteria may contain consistent data string, similarity and etc. in the following diagram, we just use consistent data, but is not limited thereto.

Figure 9:
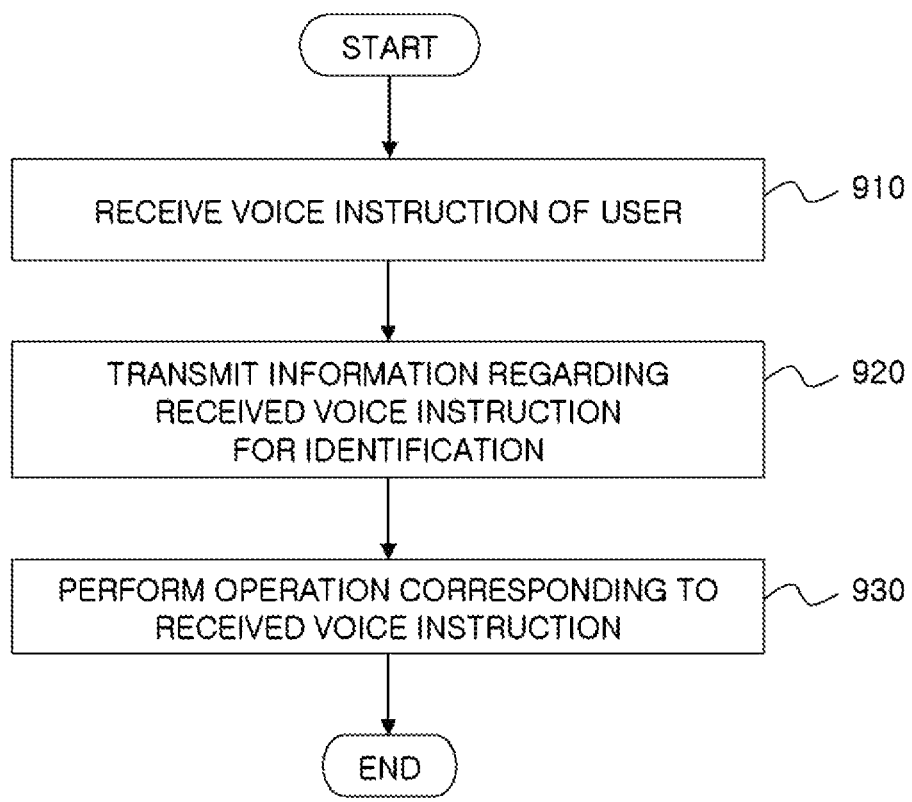
FIG. 9 is a flowchart of a method according to an embodiment.

FIG. 9 is a flowchart of a method according to an embodiment.

At operation 910, the electronic device may receive a voice instruction of a user. According to an embodiment, a voiceprint mapping model is pre-established for multiple devices of the user.

*105 At operation 920, the electronic device may transmit information regarding the voice instruction to a control device for identifying the user. The identification of the user may be performed by mapping to a first voiceprint which is registered by another electronic device, a second voiceprint of the voice instruction of the user based on the voiceprint mapping model.

At operation 930, the electronic device may perform an operation corresponding to the voice instruction upon the identification of the user.

According to an embodiment, the information regarding the voice instruction includes voice data of the voice instruction.

According to an embodiment, the voiceprint mapping model is generated based on voiceprint feature data collected for a plurality of electronic devices including the electronic device and the other electronic device.

According to an embodiment, the plurality of electronic devices belong to a same network.

According to an embodiment, the voiceprint mapping model is trained by raw voice data from the plurality of electronic devices in the same network, and deployed to the control device.

According to an embodiment, the voiceprint mapping model returns the first voiceprint of the other electronic device in response to the second voiceprint of the voice instruction received at the electronic device based on the voiceprint mapping model.

According to an embodiment, the voiceprint mapping model is trained through deep learning, in response to the user starting to use a new electronic device, by integrating voiceprint feature data collected for the new electronic device to the voiceprint feature data collected for the plurality of electronic device.

According to an embodiment, the returned first voiceprint of the other electronic device is used for the identification of the user.

According to an embodiment, the operation corresponding to the voice instruction is performed by accessing user data of the user upon the identification of the user.

According to an embodiment, the instructions, device information of the electronic device is transmitted to the control device for identifying the electronic device that has received the voice instruction.

According to an embodiment, the first voiceprint is bound with the user's ID.

According to an embodiment, a method is provided. The method includes: establishing a voiceprint mapping model between a plurality of electronic devices including a first electronic device and a second electronic device; extracting a first voiceprint feature of a user's voice from the first electronic device and registering the first voiceprint; extracting a second voiceprint feature of the user's voice instruction from the second electronic device; mapping the second voiceprint feature to the registered first voiceprint based on the voiceprint mapping model to identify the user; and allowing the second electronic device to perform an operation corresponding to the voice instruction upon the identification of the user.

According to an embodiment, the allowing includes: allowing the second electronic device to access user data of the user upon the identification of the user.

According to an embodiment, a cross-device voiceprint recognition method and a system are provided to improve accuracy of cross-device voiceprint recognition.

In an embodiment, the cross-device voiceprint recognition method applied to a control device, includes: establishing a voiceprint mapping model between different devices; extracting a voiceprint from a voice recorded by a first device and registering the voiceprint; extracting a voiceprint feature from a voice instruction recorded by a second device, mapping the voiceprint feature to a voiceprint registered through another device based on the established voiceprint mapping model, and identifying a corresponding user ID; and operating user data corresponding to the user ID according to the voice instruction to implement voice control.

In an embodiment, the establishing a voiceprint mapping model between different devices includes: extracting a voiceprint from voices recorded by each device, and modeling by extracting a voiceprint feature or by a deep learning method to establish the voiceprint mapping model of a mapping relationship between voiceprints of voices recorded by the different devices.

In an embodiment, the registering the voiceprint includes: binding the voiceprint with an existing user ID, or directly determining the voiceprint as the user ID.

In an embodiment, the voice recorded by the first device is a preset prompt text read by a user.

In an embodiment, the method further includes: after the registering the voiceprint, importing history playback data into the corresponding user ID; and after the identifying the corresponding user ID, reading the history playback data of the user ID, and recommending contents according to the history playback data.

According to an embodiment, a cross-device voiceprint recognition system may be provided, and the system includes: a control device and at least one device with a microphone; wherein the at least one device with the microphone is to record a voice and send the voice to the control device; wherein a first device and a second device are the device with the microphone; the control device is to establish a voiceprint mapping model between different devices; extract a voiceprint from a voice recorded by the first device and register the voiceprint; extract a voiceprint feature from a voice instruction recorded by the second device; map the voiceprint feature to a voiceprint registered through another device based on the established voiceprint mapping model, and identify a corresponding user ID; and operate user data corresponding to the user ID according to the voice instruction to implement voice control.

In an embodiment, the control device includes a voiceprint mapping management module, a voiceprint mapping model module, a voiceprint feature extraction module, a user system module, and a model generation management module, wherein, the voiceprint mapping management module is to map a currently input voiceprint to a voiceprint of another device according to the pre-established voiceprint mapping model between the different devices; the voiceprint mapping model is a pre-generated voiceprint mapping model between devices; the voiceprint feature extraction module is to extract the voiceprint feature according to input voice data; the user system module is to register the voiceprint and manage the user ID; and the model generation management module is to establish the voiceprint mapping model between the different devices.

In an embodiment, the voiceprint feature extracted by the voiceprint feature extraction module is all of voiceprint data extracted based on the input voice, or part of the voiceprint data extracted based on the input voice.

In an embodiment, the voiceprint feature extraction module is to extract a voiceprint from voices recorded by each device; the model generation management module is to model by the extracted voiceprint feature or by a deep learning method to establish the voiceprint mapping model of a mapping relationship between voiceprints of voices recorded by the different devices.

In an embodiment, the user system module includes a voiceprint registration submodule, a voiceprint matching submodule, a user ID submodule, and a user data submodule; wherein, the voiceprint registration submodule is to associate a voiceprint of a newly registered user with an existing user ID in the user system; the voiceprint matching submodule is to match a received voiceprint with a registered voiceprint to determine a corresponding user ID; the user ID submodule is to maintain the user ID, where the user ID is a unique identifier of a user; the user data submodule is to maintain user data, where the user data is private data related to the user.

According to an embodiment, differences between different voice devices may be protected, the accuracy of cross-device voiceprint recognition may be improved, and a voice operation may be performed on the same device through different devices, which provides better user experience.

A predefined operation rule or AI model may be made through training. Herein, being made through training means that a basic AI model is trained based on multiple pieces of training data by using a learning algorithm and thus a predefined operation rule or AI model configured to achieve desired characteristics (or purposes) is made. The training may be performed by a device having an AI function according to the disclosure, or by a separate server and/or system. The learning algorithm may include, for example, supervised learning, unsupervised learning, semi-supervised learning, or reinforcement learning, but is not limited thereto. The AI model may include a plurality of neural network layers. Each of the plurality of neural network layers has a plurality of weight values and performs neural network calculation through calculation between a calculation result of a previous layer and the plurality of weight values. The plurality of weight values of the plurality of neural network layers may be optimized by a result of training the AI model. For example, the plurality of weight values may be modified to reduce or minimize a loss value or a cost value obtained by the AI model during the training process. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

According to an embodiment, a computer readable storage medium storing a computer program is further provided. The computer readable storage medium stores a computer program that, when executed by a processor, causes the processor to execute a method of displaying an icon in an electronic terminal. The computer readable storage medium is any data storage device that can store data which is read by a computer system. Examples of the computer readable storage medium includes: a read only memory (ROM), a random access memory (RAM), a read-only optical disc, a magnetic tape, a floppy disk, an optical data storage device, and a carrier wave. A computer program product may be or include the computer readable storage medium, but is not limited thereto. For example, the computer readable medium may include the computer program product.

Moreover, it should be understood that various units according to an embodiment may be implemented as hardware components and/or software components. Those skilled in the art can implement the various units, for example, using a Field Programmable Gate Array (FPGA) or an Application Specific Integrated Circuit (ASIC), depending on the processing performed by the various defined units.

Further, embodiments may be implemented as computer codes in a computer readable recording medium by those skilled in the art according to the disclosure. The computer codes are carried out when the computer codes are executed in a computer.

Although the disclosure has been described with various embodiments, various changes and modifications may be suggested to one skilled in the art. It is intended that the disclosure encompass such changes and modifications as fall within the scope of the appended claims.

The invention claimed is:

1. An electronic device comprising:
at least one processor; and
a memory comprising instructions, which when executed, control the at least one processor to:
receive a voice instruction of a user at the electronic device;
transmit information regarding the voice instruction, to a control device for identifying the user based on a voiceprint mapping model,
wherein the identification of the user is performed by mapping a second voiceprint extracted from the voice instruction of the user to a first voiceprint registered by another electronic device,
wherein the voiceprint mapping model returns the first voiceprint of the another electronic device in response to the second voiceprint of the voice instruction received at the electronic device, and wherein the first voiceprint is associated with identification (ID) of the user and registered between the another electronic device and the control device; and
perform an operation corresponding to the voice instruction upon the identification of the user.

2. The electronic device of claim 1, wherein the information regarding the voice instruction comprises voice data of the voice instruction.

3. The electronic device of claim 1, wherein the voiceprint mapping model is generated based on voiceprint feature data collected for a plurality of electronic devices including the electronic device and the another electronic device.

4. The electronic device of claim 3, wherein the plurality of electronic devices belong to a same network.

5. The electronic device of claim 4, wherein the voiceprint mapping model is trained by raw voice data from the plurality of electronic devices in the same network, and deployed to the control device.

6. The electronic device of claim 3, wherein the voiceprint mapping model is trained through deep learning, in response to the user starting to use a new electronic device, by integrating voiceprint feature data collected for the new electronic device to the voiceprint feature data collected for the plurality of electronic devices.

7. The electronic device of claim 1, wherein the returned first voiceprint of the another electronic device is used for the identification of the user.

8. The electronic device of claim 1, wherein the instructions, when executed, further control the at least one processor to:
perform the operation corresponding to the voice instruction by accessing user data of the user upon the identification of the user.

9. The electronic device of claim 1, wherein the instructions, when executed, further control the at least one processor to:
transmit device information of the electronic device to the control device for identifying the electronic device that has received the voice instruction.

10. The electronic device of claim 1, wherein the first voiceprint is bound with the user's ID.

11. A method comprising:
receiving a voice instruction of a user at an electronic device;
transmitting information regarding the voice instruction to a control device for identifying the user based on a voiceprint mapping model,
wherein the identification of the user is performed by mapping a second voiceprint extracted from the voice instruction of the user to a first voiceprint registered by another electronic device,
wherein the voiceprint mapping model returns the first voiceprint of the another electronic device in response to the second voiceprint of the voice instruction received at the electronic device, and
wherein the first voiceprint is associated with identification (ID) of the user and registered between the another electronic device and the control device; and
performing an operation corresponding to the voice instruction upon the identification of the user.

12. A non-transitory computer program product comprising a computer readable medium having stored thereon instructions, which when executed, cause at least one processor to carry out the method of claim 11.

13. A method comprising:
establishing a voiceprint mapping model between a plurality of electronic devices including a first electronic device and a second electronic device;
extracting a first voiceprint feature of a user's voice from the first electronic device and registering the first voiceprint;
extracting a second voiceprint feature of a voice instruction of a user from the second electronic device;
mapping the second voiceprint feature to the registered first voiceprint based on the voiceprint mapping model to identify the user, wherein the voiceprint mapping model returns the first voiceprint feature of the first electronic device in response to the second voiceprint feature of the voice instruction received at the second electronic device; and
allowing the second electronic device to perform an operation corresponding to the voice instruction upon the identification of the user.

14. The method of claim 13, wherein the allowing comprises:
allowing the second electronic device to access user data of the user upon the identification of the user.

\* \* \* \* \*